United States Patent Office 2,955,099
Patented Oct. 4, 1960

2,955,099

VISCOSITY STABILIZED MELT EXTRUDABLE PERFLUOROCARBON POLYMERS

Robert Salim Mallouk and Bernd Wilhelm Sandt, Wilmington, Del., assignors to E. I. du Pont de Nemours and Company, Wilmington, Del., a corporation of Delaware No Drawing. Filed Mar. 29, 1957, Ser. No. 649,314

12 Claims. (Cl. 260—45.7)

This invention relates to melt extrudable perfluorocarbon resins, and more particularly to viscosity stabilized, melt extrudable hexafluoropropylene/tetrafluoroethylene interpolymers.

It is disclosed in the copending application of M. I. Bro and B. W. Sandt, Serial No. 649,451, filed on even date herewith, that hexafluoropropylene/tetrafluoroethylene interpolymers having a specified combination of characteristics may be extruded in the molten state at useful rates to yield tough, homogeneous extrudates. These characteristics are specific melt viscosity in the range of $1.5 \times 10^3$ to $3 \times 10^5$ poises, specific I.R. ratio of 1.5 to 6 which is at least equal to 12.26 minus (1.96 times the common logarithm of the specific melt viscosity), and specific volatile content of less than 0.3 percent. It is further disclosed that such interpolymers may be prepared by a process which comprises interpolymerizing hexafluoropropylene and tetrafluoroethylene in the presence of a free radical initiator while regulating the hexafluoropropylene/tetrafluoroethylene proportion and the initiator concentration to produce a suitable intermediate interpolymer, separating the intermediate interpolymer from the reaction mixture, and heating it in the molten state with removal of volatiles.

Inconveniences are experienced in preparing resins of this kind because the specific melt viscosity of the products obtained under preparative conditions which are apparently the same may vary considerably, even when the specific melt viscosities of the intermediate resins are approximately the same, since the melt viscosities may change markedly during the step of heating them in the molten state with removal of volatiles. Further inconveniences are experienced in using the devolatilized products, since changes in melt viscosity may also occur during their heating in the molten state under melt extrusion conditions, making it difficult to fabricate them at uniform rates so as to obtain extrudates of uniform caliper and toughness.

It is a general object of the present invention to provide melt extrudable hexafluoropropylene/tetrafluoroethylene interpolymer compositions which are stabilized against viscosity changes during heating in the molten state. A further object is to provide hexafluoropropylene/tetrafluoroethylene interpolymer compositions having a specific melt viscosity of less than $3 \times 10^5$ poises, a specific I.R. ratio in the range of 1.5 to 6, and a specific volatile content of greater than 0.3 percent which are stabilized against viscosity change during heating in the molten state with removal of volatiles. Yet another object is to provide hexafluoropropylene/tetrafluoroethylene interpolymer compositions having a specific melt viscosity in the range of $1.5 \times 10^3$ to $3 \times 10^5$ poises, a specific I.R. ratio in the range of 1.5 to 6 which is at least equal to 12.26 minus (1.96 times the common logarithm of the specific melt viscosity), and a specific volatile content of less than 0.3 percent which are stabilized against viscosity changes under melt extrusion conditions. Other objects will be apparent hereinafter.

The terms "specific melt viscosity," "specific I.R. ratio" and "specific volatile content" used herein are defined in the aforesaid patent application of Bro and Sandt.

By the term "specific melt viscosity" as used herein is meant the apparent melt viscosity as measured at 380° C. under a shear stress of 6.5 pounds per square inch. By the term "specific I.R. ratio" as used herein is meant the net absorbance in the infra-red at a wave length of 10.18 microns divided by the net absorbance in the infrared at a wave length of 4.25 microns, of a film about 2 mils thick obtained by melting, pressing and water quenching a sample of the resin. By the term "specific volatile content" as used herein is. meant the percentage of the weight of the dried resin lost when a sample is heated at 380° C. under ca. 10/mm. absolute pressure for 30 minutes with removal of volatiles.

According to the present invention the aforesaid objects are achieved by compositions of melt extrudable hexafluoropropylene/tetrafluoroethylene interpolymer compositions containing as a viscosity stabilizer therefor cationic metal compound incorporated in said interpolymer in amount ranging from $1 \times 10^{-7}$ to $2 \times 10^{-4}$ gram equivalents, based on cation, per gram equivalent of interpolymers, said cationic metal compound being one which is stable against thermal decomposition at temperatures up to 400° C.

In general, it has been found, hexafluoropropylene/tetrafluoroethylene interpolymers having a specific melt viscosity of $3 \times 10^5$ poises or less tend to increase in melt viscosity upon being heated in the molten state, and this tendency is accentuated when the heating is carried out in the presence of oxygen. Cationic metal compounds function to minimize the normal tendency of the interpolymer to increase in melt viscosity, to an extent which is dependent upon the kind and amount of cationic metal compound employed.

In general, the effectiveness of the cationic metal compound tends to increase with increasing ionic radius of the cationic metal component and with increasing lability of the anionic component. Thus the most active cationic metal compounds are those of cationic metals such as potassium, caesium and rubidium, particularly in the form of salts of labile anions such as iodide and bromide, while the least active are those of cationic metals such as lithium, beryllium and aluminum, particularly in the form of salts of anions such as fluoride and silicate. Compounds of cationic metal with anions such as carbonate and nitrate which thermally decompose in the molten interpolymer, however, tend to cause inhomogeneities in the interpolymer and are therefore not suitable for use as viscosity stabilizers. Preferably, the cationic metal compound employed is soluble in the molten interpolymer, again in the interest of avoiding inhomogeneities.

The heating of intermediate hexafluoropropylene/tetrafluoroethylene interpolymer in the molten state with removal of volatiles to obtain residual products having a specific volatile content of less than 0.3 percent may be conveniently carried out at temperatures in the range of 300 to 400° C. for periods ranging from two minutes to thirty hours or more, depending upon such factors as the thickness of the bed of polymer and the temperature and pressure employed. In general, however, it is advantageous to carry out such heating under conditions of low bed thickness, reduced pressure, and high temperature in order to expedite the removal of volatiles. Under the latter conditions, it is preferred to incorporate very small amounts of cationic metal compound, in the range of $1 \times 10^{-7}$ to $1 \times 10^{-5}$ gram equivalents, based on cation, per gram of interpolymer, as a viscosity stabilizer. Higher amounts, particularly when using the less active stabilizers, are preferably employed when carrying out the heating in air.

Similarly, in the fabrication of hexafluoropropylene/tetrafluoroethylene interpolymers via melt extrusion, the heating prior to extrusion is ordinarily carried out in a confined space in the presence of very minor amounts of oxygen, and under such circumstances, also it is preferable to employ as a viscosity stabilizer very small amounts of cationic metal compound in the range of $1 \times 10^{-7}$ to $1 \times 10^{-5}$ gram equivalents, based on cation, per gram of interpolymer. Larger amounts are preferred only when it is desired to incorporate an oxidizing agent to improve color during the melt extrusion. Potassium perchlorate may be used with particular advantage under such circumstances since it functions in the dual role of oxidant and viscosity stabilizer.

The cationic metal compounds may be readily incorporated in the interpolymer by saturating the interpolymer with a solution of the desired cationic metal compound and evaporating the solvent. In a preferred procedure the cationic metal compound is incorporated by carrying out the interpolymerization in the presence of an aqueous solution of the desired cationic metal compound or precursor thereto in excess, and during separation of the intermediate product from the reaction mixture, washing the product as necessary to remove the undesired excess. The amount of cationic metal present may be determined by extracting a sample of the finely divided interpolymer with hot nitric acid and analyzing the extract.

The invention is more particularly described and explained by means of the following examples, which, however, are not intended to be limiting.

EXAMPLE I

An intermediate interpolymer is prepared by the general procedure described in Example I of Serial No. 649,451 (ammonium persulfate initiator). The washed and dried intermediate has a specific melt viscosity of $3 \times 10^5$ poises. Weighed samples of the intermediate are saturated with ca. 50 ml. aqueous solutions containing a small amount of organic dispersing agent, as controls, and with similar solutions containing small amounts of cationic metal compound to determine the gross effect these compounds have upon viscosity change during heating in the molten state. The saturated samples are then dried during 16 hours in an air oven at 200° C. The dried samples are then heated in an air oven during 3 hours in the molten state at 380° C., and subjected to specific melt viscosity determination. The results are summarized in Table I. Specific melt viscosities are determined by the procedure described in the specification of the aforesaid application, Serial No. 649,451.

*Table I*

| Additive | Concentration, Gram Equivalents Per Gram of Interpolymer $\times 10^5$ | Specific Melt Viscosity, Poises $\times 10^{-5}$ |
|---|---|---|
| None | | 43 |
| $AgNO_3$ | 1 | 16 |
| $AlF_6$ | 3 | 30 |
| $AlPO_4$ | 3 | 26 |
| $BaCl_2$ | 2 | 3.4 |
| $BaF_2$ | 2 | 29 |
| $Ba(OH)_2$ | 3 | 1.5 |
| $Bi(NO_3)_3$ | 2 | 3.7 |
| $CaBr_2$ | 2 | 12 |
| $CaCl_2$ | 2 | 15 |
| $CaF_2$ | 2 | 18 |
| $Ca(OH)_2$ | 6 | 15 |
| $Ca_3(PO_4)_2$ | 2 | 18 |
| $CdCl_2$ | 2 | 1.4 |
| $CdI_2$ | 3 | 3.4 |
| $CrCl_3$ | 3 | 2.2 |
| $CrF_3$ | 1 | 7.7 |
| $CsCl$ | 1 | 0.2 |
| $CsF$ | 2 | 0.3 |
| $FeSO_4$ | 2 | 7.1 |
| $HgCl_2$ | | 29 |

*Table I—Continued*

| Additive | Concentration, Gram Equivalents Per Gram of Interpolymer $\times 10^5$ | Specific Melt Viscosity, Poises $\times 10^{-5}$ |
|---|---|---|
| $KBr$ | 1 | 0.2 |
| $KCl$ | 1 | 3.5 |
| $KCNO$ | 1 | 0.4 |
| $KF$ | 1 | 0.3 |
| $KI$ | 1 | 0.2 |
| $LiCl$ | 1 | 38 |
| $LiF$ | 1 | 34 |
| $MgCl_2$ | 2 | 2.2 |
| $MnCl_2$ | 2 | 2.3 |
| $NaAlO_2$ | 1 | 7.7 |
| $NaBr$ | 1 | 2.9 |
| $NaBrO_3$ | 1 | 4.4 |
| $NaCl$ | 1 | 20 |
| $Na_2Cr_2O_7$ | 2 | 4.2 |
| $NaF$ | 1 | 15 |
| $NaHF_2$ | 1 | 36 |
| $NaI$ | 1 | 32 |
| $Na_2MoO_4$ | 2 | 0.3 |
| $NaOCN$ | 1 | 8.4 |
| $Na_4P_2O_7$ | 4 | 0.8 |
| $Na_2S$ | 2 | 3.2 |
| $NaSCN$ | 1 | 28 |
| $Na_2SiO_3$ | 2 | 25 |
| $NiCl_2$ | 2 | 5.9 |
| $PbCl_2$ | 2 | 0.5 |
| $Sb_2O_3$ | 3 | 1.7 |
| $Sb_2S_3$ | 3 | 0.7 |
| $SrCl_2$ | 2 | 7.3 |
| $ZnBr_2$ | 2 | 0.7 |
| $ZnF_2$ | 2 | 26 |

EXAMPLE II

The procedure of Example I is repeated, using an intermediate interpolymer prepared by the general procedure of Example I of Serial No. 649,451 and having a specific melt viscosity of $2.5 \times 10^5$ poises, and selected salts in varying concentrations. The results are summarized in Table II.

*Table II*

| Additive | Concentration, Gram Equivalents Per Gram of Interpolymer $\times 10^5$ | Specific Melt Viscosity, Poises $\times 10^{-5}$ |
|---|---|---|
| None | | 50 |
| $BaCl_2$ | 10 | 1.1 |
| $BaCl_2$ | 2.5 | 2.5 |
| $BaCl_2$ | 0.6 | 6.3 |
| $CdI_2$ | 0.25 | 2.2 |
| $CdI_2$ | 0.01 | 25 |
| $KBr$ | 0.5 | 0.7 |
| $KBr$ | 0.2 | 6.7 |
| $KF$ | 0.5 | 0.6 |
| $KF$ | 0.2 | 4.9 |
| $LiCl$ | 20 | 0.9 |
| $LiCl$ | 1.5 | 9.7 |
| $NaBr$ | 1.5 | 0.9 |
| $NaBr$ | 0.75 | 2.6 |

EXAMPLE III

Samples of an intermediate interpolymer prepared by the general procedure of Example II of Serial No. 649,451 (potassium persulfate initiator) and having a specific melt viscosity of $9 \times 10^4$ poises are analyzed for potassium and then subjected to additional washing by violent agitation during two minutes with 2.5 volumes of demineralized water, followed by filtration and redrying at 150° C. during 16 hours in an air oven, and redetermination of specific melt viscosity. The samples are then again analyzed for potassium and further subjected to heat treatment at 380° C. for various periods of time, both in the presence of air (air oven), and in the substantial absence of air (confined in melt indexer), with results as shown in Table III.

Table III

| K Present Gram Equivalents Per Gram of Interpolymer | Extra Washings | Specific Melt Viscosity, Poises×10⁻⁴ | | | | | | |
|---|---|---|---|---|---|---|---|---|
| | | Time in Air Oven, Hrs. | | | Time in Melt Indexer, Hrs. | | | |
| | | 0.25 | 0.5 | 1 | 0.09 | 0.25 | 0.5 | 1 |
| 25×10⁻⁶ | None | 7.8 | 9.2 | 12.7 | 9 | 8.7 | 8.1 | 6.9 |
| 15×10⁻⁶ | Two | 8.8 | 14.3 | 18.8 | 9.9 | 9.4 | 8.6 | 7.5 |
| 2×10⁻⁷ | Five | 13 | 90 | 209 | 10.2 | 10.7 | 11.4 | 12 |

EXAMPLE IV

Samples of intermediate interpolymer produced by the general procedure of Example VII of Serial No. 649,451 (iron-bisulfite-citrate initiator) and having a specific melt viscosity of $1.7 \times 10^5$ poises are heated for various times at 380° C. both in the presence and substantial absence of air, as described in the preceding examples. Analysis indicates the sample contains about 70 p.p.m. iron. Following the heat treatments, specific viscosities are again determined. Results are summarized in Table IV.

Table IV

| Heating Time, Hr. | Specific Melt Viscosity, Poises×10⁻⁵ | |
|---|---|---|
| | In Air Oven | In Melt Indexer |
| 0 | 1.7 | 1.7 |
| 0.25 | 2.6 | |
| 0.5 | 3.0 | |
| 1 | 20 | 3.1 |
| 3 | 206 | 3.2 |

EXAMPLE V

Samples of intermediate interpolymer prepared by the general procedure of Example II of Serial No. 649,451 (potassium persulfate initiator) and having a specific melt viscosity of $9 \times 10^4$ poises are subjected to two washings with 2.5 volumes of demineralized water containing various amounts of sodium sulfate, followed by filtration and redrying at 150° C. during 16 hours in an air oven. Weight differences between the original dry sample and its wet weight after filtration are employed as a basis for calculating the amount of salt incorporated. Dried samples of the salted products are subjected to heating in air at 350° and 380° C. for various periods of time, and the specific melt viscosities determined with results as shown in Table V.

Table V

| Na²SO⁴, Gram Equivalents Per Gram of Interpolymer | Specific Melt Viscosity, Poises×10⁻⁴ | | | | | | |
|---|---|---|---|---|---|---|---|
| | At 350° C.—Time, Hr. | | | At 380° C.—Time, Hr. | | | |
| | 1 | 2 | 3 | 5 | 0.25 | 0.5 | 1 | 3 |
| None | 12.4 | 13.8 | 18.2 | 33.2 | 8.8 | 14.3 | 18.8 | 112 |
| 1×10⁻⁵ | 9.1 | 11.6 | 33.3 | 60.7 | 9.8 | 18.2 | 59.3 | 82.5 |
| 2×10⁻⁵ | 8.2 | 11.2 | 16.0 | 25.3 | 10.1 | 11.7 | 36.2 | 65.6 |
| 4×10⁻⁵ | 8.8 | 10.5 | 14.1 | 15.7 | 10.1 | 16.2 | 21.8 | 32.3 |
| 8×10⁻⁵ | 9.0 | 10.7 | 13.0 | 18.8 | 10.4 | 9.0 | 9.0 | 9.9 |

EXAMPLE VI

Samples of interpolymer identical to those employed in the preceding example are admixed as therein described with $4 \times 10^{-5}$ gram equivalents per gram of interpolymer of potassium perchlorate. Upon heating at 380° C. in air for 30 minutes and for 3 hours, the specific melt viscosities remain substantially unchanged at $8.1 \times 10^4$ poises in each case. Upon heating at 380° C. in the absence of air for 0.25, 0.5, and one hour, the specific melt viscosities likewise remain substantially unchanged at 8.1, 7.5, and $6.8 \times 10^4$ poises, respectively.

EXAMPLE VII

Intermediate hexafluoropropylene/tetrafluoroethylene interpolymer prepared by the general procedure of Example II of Serial No. 649,451 and having a specific melt viscosity of $10.3 \times 10^4$ poises, an I.R. ratio of 3.6, a specific volatile content of about 0.6 percent, and a potassium content of about $1 \times 10^{-6}$ gram equivalents per gram of interpolymer, is fed to 2" I.D. extractor extruder of Duranickel (Ni-Mn-Al alloy), having a sudden compression type vented screw 36" long, a 10" extraction zone, an adapter and a ⅜" beading discharge orifice. The rear barrel is maintained at 260° C., the rear center barrel at 375° C., the front barrel at 400° C., in the vicinity of the extraction zone, and the adapter and die at ca. 380° C. The vented portion of barrel is held under a vacuum of 27.5"/Hg. The interpolymer is extruded through the apparatus at 9.6 pounds per hour, to yield an extrudate having a specific volatile content of less than 0.3 percent, an I.R. ratio of 3.6, and a specific melt viscosity of $10.7 \times 10^4$ poises. The extrudate after heating for 3 hours in air at 350° C., has a specific melt viscosity of $8.5 \times 10^4$ poises and after heating for 30 minutes at 380° C. in the absence of air a specific melt viscosity of $9.5 \times 10^4$ poises.

We claim:

1. A resinous melt extrudable hexafluoropropylene/tetrafluoroethylene interpolymer composition having a specific I.R. ratio in the range of 1.5 to 6, as measured on film about 2 mils thick water-quenched from the molten composition by net absorbance at 10.18 microns wave length divided by net absorbance at 4.25 microns wave length; an initial specific melt viscosity of not more than $3 \times 10^5$ poises, and a factor of viscosity change, as between said initial specific melt viscosity and specific melt viscosity after heating said composition in air for 3 hours at 380° C., in the range of 0.06 to 14, said specific melt viscosities being as measured at 380° C. under a shear stress of 6.5 pounds per square inch; and, incorporated therein cationic metal compound in viscosity stabilizing amount in the range of $1 \times 10^{-7}$ to $2 \times 10^{-4}$ gram equivalents, based on cationic metal, per gram of said composition, said cationic metal compound being stable against thermal decomposition at temperatures up to 400° C.

2. A composition according to claim 1 having a said specific melt viscosity in the range of $1.5 \times 10^3$ to $3 \times 10^5$ poises, a said specific I.R. ratio which is at least equal to the difference between 12.26 and the product of 1.96 and the common logarithm of said specific melt viscosity, and a specific volatile content, as measured by weight loss during 30 minutes at 380° C. under a pressure of 10 mm./Hg absolute of less than 0.3 percent.

3. The composition of claim 2 in the form of a melt extruded article.

4. A composition according to claim 1 wherein the cationic metal of said incorporated cationic metal compound has an ionic radius of at least 0.8 angstrom.

5. A composition according to claim 4 wherein said cationic metal comprises potassium.

6. A composition according to claim 4 wherein said cationic metal comprises potassium and sodium.

7. A composition according to claim 4 wherein said incorporated cationic metal compound has an equivalent conductance in the range of 50 to 110 as measured at 5 percent concentration in water at 18° C.

8. Composition according to claim 7 wherein said incorporated cationic metal compound comprises potassium perchlorate.

9. Composition according to claim 7 wherein said incorporated cationic metal compound comprises potassium sulfate.

10. Composition according to claim 7 wherein said incorporated cationic metal compound comprises sodium and potassium sulfates.

11. Composition according to claim 10 wherein the combined amount of sodium and potassium sulfates is on the order of $10^{-5}$ gram equivalents, based on cation, per gram of said composition.

12. Composition according to claim 11 wherein the amount of sodium sulfate is on the order of $10^{-5}$ gram equivalents, based on cation, per gram of said composition.

References Cited in the file of this patent

UNITED STATES PATENTS

| | | |
|---|---|---|
| 2,549,935 | Sauer | Apr. 24, 1951 |
| 2,643,988 | Walter | June 30, 1953 |
| 2,705,706 | Dittman et al. | Apr. 5, 1955 |
| 2,772,444 | Burrows et al. | Dec. 4, 1956 |
| 2,784,170 | Walter et al. | Mar. 5, 1957 |
| 2,784,176 | Dittman et al. | Mar. 5, 1957 |
| 2,847,391 | Wheeler | Aug. 12, 1958 |
| 2,856,439 | Frey | Oct. 14, 1958 |
| 2,874,152 | Bolstad et al. | Feb. 17, 1959 |

UNITED STATES PATENT OFFICE
CERTIFICATE OF CORRECTION

Patent No. 2,955,099                        October 4, 1960

Robert Salim Mallouk et al.

It is hereby certified that error appears in the printed specification of the above numbered patent requiring correction and that the said Letters Patent should read as corrected below.

Column 5, lines 10 and 11, Table III, first column thereof, under the heading "K Present Gram Equivalents Per Gram of Interpolymer", line 1, for "$25 \times 10^{-6}$" read -- $2.5 \times 10^{-6}$ --; line 2, for "$15 \times 10^{-6}$" read -- $1.5 \times 10^{-6}$ --; column 5, line 57, Table V, first column thereof, in the heading, line 1, for "$Na^2SO^4$" read -- $Na_2SO_4$ --.

Signed and sealed this 11th day of April 1961.

(SEAL)
Attest:
ERNEST W. SWIDER                        ARTHUR W. CROCKER
Attesting Officer                          Acting Commissioner of Patents